United States Patent [19]

Larsson

[11] Patent Number: 4,662,614
[45] Date of Patent: May 5, 1987

[54] BLAST PIPE

[75] Inventor: Arne Larsson, Stockholm, Sweden

[73] Assignee: Oxy-Tuben AB, Bromma, Sweden

[21] Appl. No.: 709,669

[22] Filed: Mar. 8, 1985

[30] Foreign Application Priority Data

Mar. 16, 1984 [SE] Sweden .................. 8401490

[51] Int. Cl.⁴ .............................. C21B 7/16
[52] U.S. Cl. .................. 266/270; 266/225;
138/141; 285/417; 156/294
[58] Field of Search ............... 285/417; 266/225, 270;
138/141; 156/294

[56] References Cited

U.S. PATENT DOCUMENTS

| 814,491 | 3/1906 | Westerman | 285/417 |
| 3,036,929 | 5/1962 | Kawashima et al. | 266/225 X |
| 3,206,183 | 9/1965 | Marwick, Jr. | 138/145 |
| 3,292,662 | 12/1966 | Nishi | 138/141 |
| 3,430,940 | 3/1969 | Criss | 266/225 X |
| 3,503,597 | 3/1970 | Kessler et al. | 266/225 |
| 3,830,173 | 8/1974 | Hubble et al. | 138/141 X |
| 4,093,193 | 6/1978 | Cassidy et al. | 266/225 X |
| 4,296,921 | 10/1981 | Hayashi | 266/270 |

FOREIGN PATENT DOCUMENTS 1195936  6/1970  United Kingdom ............... 266/225

Primary Examiner—Thomas F. Callaghan
Attorney, Agent, or Firm—Nies, Webner, Kurz & Bergert

[57] ABSTRACT

A blast pipe (2) primarily intended for introducing gas, such as oxygen gas, into molten metal in metallurgical processes, such as steel manufacturing processes, including a pipe element (1) made preferably of steel and coated at least externally with at least one protective layer (3). The blast pipe (2) is particularly characterized by the fact that the pipe element (1) is provided with an external, preferably high compact layer (3,4) which mainly comprises organic fibres, preferably wood fibres in the form of paper, and by the fact that the fibre layer (3,4) is preferably completely or partially impregnated with a refractory substance.

9 Claims, 5 Drawing Figures

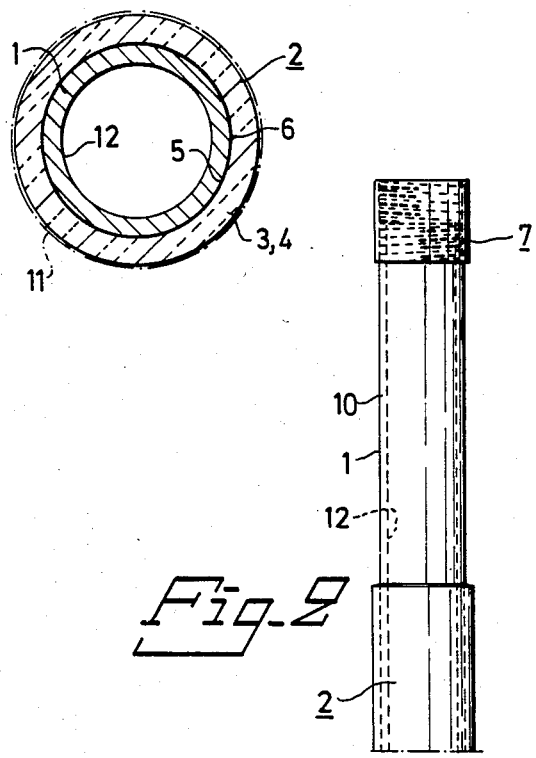
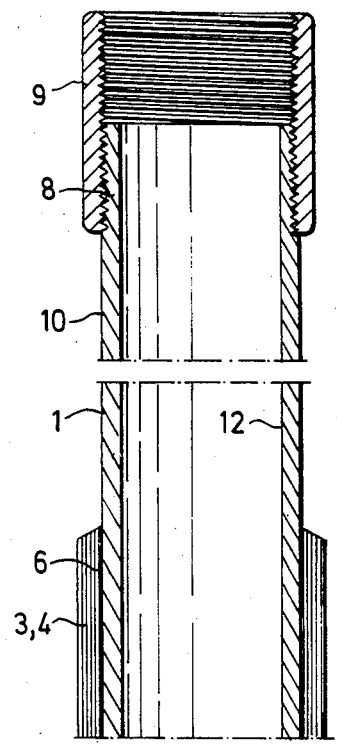
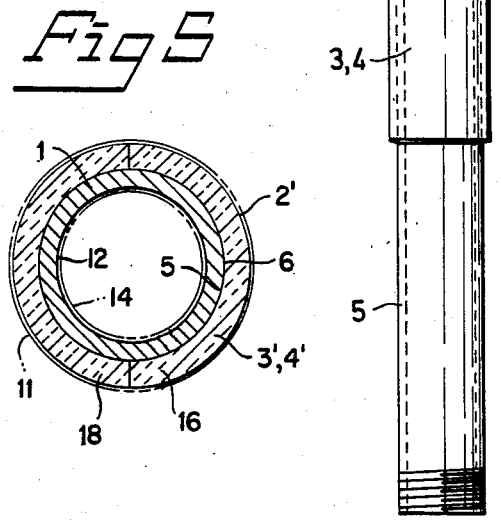
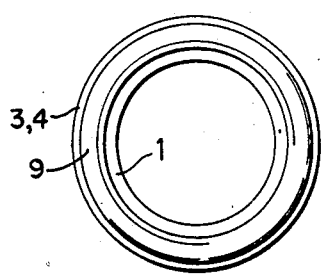

BLAST PIPE

BACKGROUND OF THE INVENTION

The present invention relates to a blast pipe intended primarily for introducing gas into molten metal in metallurgical processes, particularly steel manufacturing processes.

Blast pipes of the kind meant here are used for injecting gas, such as oxygen, argon or nitrogen or gas mixture into primarily molten metal in metallurgical processes, such as when producing steel in electrosteel furnaces. Applications are also found where there is injected a mixture of gas and solid substances for metallurgical use.

Such blast pipes are normally made of steel. The blast pipe in use is subjected to high stresses as a result of high temperatures, erosion, oxidizing environment etc., various attempts having been made to reduce the high consumption of blast pipes, this consumption being related to the aforesaid stresses to which the blast pipes are subjected and resulting from the melting and oxidation etc. thereof.

In this respect blast pipes are known in which the outer parts of the blast pipe have been alloyed by diffusion with aluminium and thereafter coated with at least one ceramic protective layer. Blast pipes which comprise a plurality of substantially ceramic layers are also known. The manufacture of these known blast pipes is associated with considerable cost. For example, the process of alloying with aluminium is effected in separate furnaces or ovens at relatively high temperatures. As will be understood, the cost of providing the ceramic layer or layers is also high. The task of providing non-brittle alloying layers and applied coatings is also difficult to accomplish and requires the application of particular measures. Brittleness results in the phenomenom of cavitation and decreases the useful life of the blast pipe.

SUMMARY OF THE INVENTION

The present invention relates to a blast pipe intended for the aforesaid purpose, said blast pipe having a useful life which is substantially as long as or longer than the useful life of known blast pipes and which can be produced at lower costs than the known blast pipes. Furthermore, the problem relating to brittleness of the protective coating of the blast pipe has been substantially overcome with the blast pipe according to the invention.

The present invention thus relates to a blast pipe intended primarily for introducing gas, such as gaseous oxygen, into molten metal in metallurgical processes, such as steel manufacturing processes, comprising a pipe which is preferably made of steel and which is provided at least externally thereof with at least one protective coating.

The blast pipe according to the invention is particularly characterized in that the pipe is provided with an external, preferably substantially compact layer comprising mainly organic fibres, preferably wood fibres in paper form; and in that said fibre layer is preferably completely or partially impregnated with a refractory substance.

The invention is described hereinafter in more detail with reference to a number of embodiments thereof and to the accompanying drawing, in which

BRIEF DESCRIPTION OF DRAWING

FIG. 1 illustrates schematically and in crosssection a first embodiment of a blast pipe according to the invention;

FIG. 2 is a schematic view of the blast pipe illustrated in FIG. 1;

FIG. 3 is a schematic longitudinal sectional view of an end part of the blast pipe illustrated in FIG. 2;

FIG. 4 illustrates the end part shown in FIG. 3 as seen from above in FIG. 3;

FIG. 5, an embodiment similar to that shown in FIG. 1, but shows a split, external, protective sleeve.

DETAILED DESCRIPTION

In FIG. 1 the reference 1 identifies a pipe element which is preferably made of steel and which forms part of the blast pipe 2 according to the invention, said pipe being intended for the transportation of at least gas. In the embodiment illustrated in FIG. 1 the pipe element 1 is provided with an external, preferably highly compact protective layer 3 which to a large extend comprises organic fibres, preferably wood fibres in paper form.

In this respect the layer 3 suitably comprises a paper sleeve 4, preferably of the kind with which in crosssection the sleeve wall comprises a plurality of substantially concentric layers of paper. The sleeve 4, the layer 3, may also conceivable comprise a pressed tube or layer comprising fibres and binder.

In accordance with the invention the fibre layer is preferably totally or partially, preferably totally, i.e. through the whole layer in the direction of its thickness, impregnated with a refractory or fibreproof substance. This substance may comprise mainly silicates, preferably alkalisilicates, particularly sodium silicate, so-called water-glass. The substance may also comprise substantially an organic substance, such as a resin, preferably a silicon resin. It will be understood, however, that other refractory substances are also conceivable.

In the case of a paper sleeve 4 comprising a multiple of concentrical paper layers, the layers are suitable bonded together substantially with the aid of the impregnating substance.

In the case of a sleeve 4 made of paper or corresponding material, the sleeve 4 is bonded to the outer cylindrical surface 5 of the pipe element 1 by means of an adhesive layer 6. The adhesive suitably comprises to a substantial extent a refractory substance of the kind aforementioned with regard to said impregnation, for example water glass, and preferably includes organic fibres, preferably wood fibres in the form of wood flour.

In the embodiments illustrated in FIGS. 2-3 blast pipes 2 are arranged to be mutually connected end-to-end at respective ends 7 thereof, wherewith each pipe element 1 has at the ends 7 thereof a screw-thread portion 8 which coacts with a connecting sleeve 9 or like element. The blast pipe 2 has a layer-free portion 10 at the ends 7 thereof.

According to another embodiment of a blast pipe according to the invention a further layer 11, shown in broken lines in FIG. 1, is arranged adjacent the layer 3, this further layer 11 comprising substantially a refractory substance of preferably the kind used to impregnate the layer 3 and preferably comprising organic fibres, such as wood fibres in the form of wood flour.

The function of the blast pipe according to the invention and the manner in which the blast pipe is manufactured will, in the main, be understood from the aforegoing. The layer 3 and the layer 11 can be applied to the pipe element 1 with the aid of very simple means. For example, the layer 3 can be applied in the form of a sleeve 4. It is also conceivable to wind paper around the pipe element 1. The sleeve can be impregnated by immersing the same in the refractory substance, such as water glass, and/or by bonding together the layers forming the sleeve 4 with said substance, when considered suitable.

Organic fibres which have been impregnated in this way have been found to possess particularly good refractory properties and thus to provide good protection. In this way there have been produced blast pipes whose length of useful life is equal to or better than the useful life of known blast pipes.

As will be understood from the aforegoing, the invention provides a blast pipe which can be produced much more easily than known blast pipes and at much lower cost. Another important feature is that the blast pipe produced in accordance with the invention is light in weight.

Although the invention has been described with reference to one embodiment thereof it will be understood that other embodiments are conceivable and that minor modifications can be made without departing from the concept of the invention.

For example, it may be suitable in certain cases to apply a layer, preferably a layer 14 (see FIG. 5) of the kind aforedescribed, also to the inner cylindrical surface 12 of the pipe element.

Other refractory substances than those mentioned above which can be readily applied, such as water glass for example, can also conceivably be used. One organic substance conceivably suitable in many cases is hydrolyzed ethyl silicate.

In the aforegoing it has been said that the fibres are preferably impregnated with a refractory substance. In certain cases, inter alia when the fibres themselves inherently incorporate a refractory substance, this impregnating step may be omitted. In this regard, such organic fibres, for example in flour form, may be applied with the aid of a binder which is not considered to be refractory.

As will be understood, there are several embodiments which can be considered conceivable with respect to primarily the layer 3 within the scope of the invention. For example, the layer 3 may be produced by applying a mixture of fibres, such as fibres in the form of wood flour, and refractory substance, such as alkali silicate or hydrolyzed ethyl silicate, suitably by repeatedly immersing or coating the pipe element 1. As shown in FIG. 5, the organic fibres 3' may also comprise a sleeve 4' made of wood or pressed wood, such as veneer in tubular form, this wooden sleeve being applied in tube form or in the form of elongated sections, such as halves, 16 and 18 which together form a complete tube. The organic fibres may also conceivably be present in the form of thin wooden strips which, suitably after being softened, are wound to a desired layer form.

The two latter types of layer 3 are suitably bonded with the aid of an adhesive of the aforementioned kind.

With regard to the dimensions of the aforementioned layers 3 it can be mentioned that very good results have been obtained with layers 3 having a thickness of 5–8 mm. Although a preferred thickness of the layer 3 lies within this given range, layers of greater or smaller thickness can also be used of course.

When joining pipes according to FIGS. 2–4, in which layer-free portions are located at the ends of each pipe, there is suitably applied at the joint a layer in the form of at least one sleeve of substantially the same kind as the aforesaid layer 3, in order to protect the pipe element 1 and the joint and to obtain a substantially continuous outer surface on the blast pipe 2.

The invention is thus not limited to the aforedescribed embodiments, and modifications can be made within the scope of the following claims.

I claim:

1. A blast pipe, primarily intended for introducing gas, such as oxygen gas, into molten metal in metallurgical processes, such as steel manufacturing processes, comprising a metallic, pipe, preferably made from steel, with a coating of at least one external protective, highly compacted layer comprising a refractory substance, characterized in that said layer is in the form of a tubular paper sleeve (4) consisting substantially of organic fibres, a refractory substance impregnated into said tubular paper sleeve (4) and an adhesive layer (6) of said refractory substance bonding said sleeve to the outer cylindrical surface (5) of the pipe (1), and a layer of said refractory substance being provided on the internal surface of the pipe (1).

2. A blast pipe according to claim 1, characterized in that, in cross-section, the wall of the tubular sleeve (4) comprises a plurality of substantially concentric paper layers.

3. A blast pipe according to claim 2, characterized in that bonding material bonds the substantially concentric paper layers together, said bonding material being substantially the substance used in said impregnation.

4. A blast pipe according the claim 1, characterized in that the organic fibres of said external layer (3) comprise wood fibres in tubular sleeve form, said sleeve being elongated half cylindrical sections, which together form a complete tube, and bonding material of said refractory substance suitable bonding said layer.

5. A blast pipe according to claim 1, characterized in that the refractory substance comprises material consisting substantially of silicates.

6. A blast pipe according to claim 5, wherein said refractory substance is sodium silicate, so-called water glass.

7. A blast pipe according to claim 5, wherein said refractory substance is an organic silicon resin, such a hydrolyzed.ethyl silicate.

8. A blast pipe according to claim 5, characterized in that a further exterior layer (11) is provided adjacent the exterior surface of said tubular paper sleeve (4), said further layer (11) substantially comprising a refractory substance, of the kind used to effect said impregnation, and organic fibres comprising wood fibres in the form of wood flour.

9. A method for manufacturing blast pipes, such a pipe primarily being intended for introducing gas, such as oxygen gas, into molten metal in metallurgical processes and comprising a metallic pipe, preferably made from steel, which method comprises the steps of: providing the pipe with an external, protective, highly compacted layer comprising a refractory substance and organic fibres, by first providing a tubular paper sleeve as the external, protective, high compacted, layer on the pipe and impregnating the tubular paper sleeve with a refractory substance, bonding the impregnated tubular paper sleeve (4) to the outer cylindrical surface (5) of the pipe (1) with the aid of an adhesive layer (6) of said refractory substance, and providing a layer of said refractory substance internally of the pipe (1).

* * * * *